(12) United States Patent
Jeong et al.

(10) Patent No.: US 10,661,713 B2
(45) Date of Patent: May 26, 2020

(54) INFRARED OBJECT DETECTING MODULE AND SIDE VIEW MIRROR

(71) Applicant: LG Innotek Co., Ltd., Seoul (KR)

(72) Inventors: Youn Mo Jeong, Seoul (KR); Jae Mi Kang, Seoul (KR); Young Bae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 160 days.

(21) Appl. No.: 15/748,982

(22) PCT Filed: Jul. 28, 2016

(86) PCT No.: PCT/KR2016/008280
§ 371 (c)(1),
(2) Date: Jan. 30, 2018

(87) PCT Pub. No.: WO2017/018825
PCT Pub. Date: Feb. 2, 2017

(65) Prior Publication Data
US 2019/0001893 A1   Jan. 3, 2019

(30) Foreign Application Priority Data

Jul. 30, 2015 (KR) .................. 10-2015-0108211
Aug. 3, 2015 (KR) .................. 10-2015-0109566

(51) Int. Cl.
*B60R 1/06* (2006.01)
*B60R 1/12* (2006.01)
(Continued)

(52) U.S. Cl.
CPC .................. *B60R 1/06* (2013.01); *B60R 1/08* (2013.01); *B60R 1/12* (2013.01); *G01S 7/4813* (2013.01);
(Continued)

(58) Field of Classification Search
None
See application file for complete search history.

(56) References Cited

U.S. PATENT DOCUMENTS

2005/0243172 A1* 11/2005 Takano ............... B60R 1/12
   348/148
2006/0250224 A1* 11/2006 Steffel ................ G01S 13/931
   340/435

FOREIGN PATENT DOCUMENTS

JP     08-105961 A      4/1996
JP     2006-296685 A   11/2006
(Continued)

OTHER PUBLICATIONS

International Search Report in International Application No. PCT/KR2016/008280, filed Jul. 28, 2016.

*Primary Examiner* — Jennifer D. Carruth
(74) *Attorney, Agent, or Firm* — Saliwanchik, Lloyd & Eisenschenk (57) ABSTRACT

A side view mirror is disclosed. The side view mirror comprises: a mirror; a mirror housing supporting the mirror; and an infrared object detecting module that is fixed to the outside of the mirror housing, emits infrared rays in a direction in which the mirror housing or the mirror is oriented, and uses reflected light from the emitted infrared rays to determine whether an object is present in the direction in which the mirror housing or the mirror is oriented.

20 Claims, 9 Drawing Sheets

(51) Int. Cl.
  *G01V 8/14*    (2006.01)
  *G01S 7/481*   (2006.01)
  *G01S 17/931*  (2020.01)
  *B60R 1/08*    (2006.01)
  *G01S 17/93*   (2020.01)
  *G01S 13/931*  (2020.01)

(52) U.S. Cl.
  CPC ............ *G01S 17/93* (2013.01); *G01S 17/931* (2020.01); *G01V 8/14* (2013.01); *B60R 2001/1223* (2013.01); *G01S 2013/9315* (2020.01); *G01S 2013/93274* (2020.01)

(56) References Cited

FOREIGN PATENT DOCUMENTS

| KR | 10-2000-0000147 A | 1/2000 |
| KR | 10-2002-0015988 A | 3/2002 |
| KR | 10-0845951 B1 | 7/2008 |

* cited by examiner

INFRARED OBJECT DETECTING MODULE AND SIDE VIEW MIRROR

CROSS-REFERENCE TO RELATED APPLICATIONS

This application is the U.S. national stage application of International Patent Application No. PCT/KR2016/008280, filed Jul. 28, 2016, which claims priority to Korean Application Nos. 10-2015-0108211, filed Jul. 30, 2015; and 10-2015-0109566, filed Aug. 3, 2015, the disclosures of each of which are incorporated herein by reference in their entirety.

TECHNICAL FIELD

The present invention relates to an infrared object detecting module and a side view mirror, and more particularly, to an infrared object detecting module and a side view mirror mounted on a vehicle.

BACKGROUND ART

Generally, a side view mirror of a vehicle is used as a part of a vehicle for securing a rear view at the left and right sides of the vehicle. The side view mirror of the vehicle has limitations in visual observation by a driver and a blind spot at a certain angle due to a B-pillar. The blind spot of the vehicle is defined as an area of 13 to 45 degrees with respect to the side of the vehicle body.

Recently, many studies have been conducted to combine various safety devices in a side view mirror system so as to improve driving stability and convenience of a vehicle. Currently, a system for detecting a moving object in a blind spot using a camera and a technique for detecting an object in the entire vehicle surroundings using ultrasonic waves and radar are mainly used as vehicle blind spot detection technologies installed in a vehicle.

DISCLOSURE

Technical Problem

The present invention is directed to providing an infrared object detecting module and a side view mirror capable of detecting an object located in a blind spot during a vehicle operation using an infrared detection method to prevent an accident.

In addition, the present invention is directed to providing an infrared object detecting module and a side view mirror that can automatically detect an object located at a corresponding side in coordination with a turn signal or a steering angle signal.

In addition, the present invention is directed to providing an infrared object detecting module and a side view mirror that can analyze the possibility of collision in real time by comparing distances from an object and steering angles.

In addition, the present invention is directed to providing an infrared object detecting module and a side view mirror capable of improving accuracy and reliability by minimizing detection errors caused by external light and noise.

Technical Solution

An exemplary embodiment of the present invention provides an infrared object detecting module that includes an optical transmitter configured to emit infrared rays in an orientation direction thereof; an optical receiver including a light receiving sensor configured to detect incident infrared rays and a light shielding unit that is disposed to surround the light receiving sensor to block external light and has an opening formed in a direction in which reflected light of the infrared rays emitted by the optical transmitter is incident; and a controller configured to determine, using the infrared rays detected by the optical receiver, whether an object is present in a direction in which the optical transmitter emits infrared rays.

An exemplary embodiment of the present invention provides a side view mirror that includes a mirror; a mirror housing configured to support the mirror; and an infrared object detecting module fixed to the outside of the mirror housing, and configured to emit infrared rays in a direction in which the mirror housing or the mirror is oriented and detect, using the reflected light of the emitted infrared rays, whether an object is present in the direction in which the mirror housing or the mirror is oriented.

The infrared object detecting module may be configured to include an optical transmitter configured to emit infrared rays in an orientation direction thereof; an optical receiver including a light receiving sensor configured to detect incident infrared rays and a light shielding unit that is disposed to surround the light receiving sensor to block external light and has an opening formed in a direction in which the reflected light of the infrared light emitted by the optical transmitter is incident; and a controller configured to determine, using the infrared rays sensed by the optical receiver, whether an object is present in a direction in which the optical transmitter emits infrared rays.

Advantageous Effects

An infrared object detecting module and a side view mirror according to the present invention can prevent an accident by detecting an object located in a blind spot during a vehicle operation.

In addition, an object located at the corresponding side can be automatically detected in coordination with a turn signal or a steering angle signal.

In addition, the possibility of collision can be analyzed in real time by comparing a distance from the object and a steering angle.

In addition, detection errors due to external light and noise can be minimized to improve the accuracy and reliability of the detection.

MODES OF THE INVENTION

Although the present invention is susceptible to various modifications and may have alternative exemplary embodiments, particular exemplary embodiments thereof are described in detail with reference to the accompanying drawings. However, it will be understood that the present invention is not to be limited to the particular exemplary embodiments described herein but includes all modifications, equivalents, and alternatives thereof that fall within the spirit and scope of the present invention.

It will be understood that, although terms including an ordinal, such as first, second, etc., may be used herein to describe various components, these components should not be limited by the terms. These terms are only used to distinguish one component from another. For example, a second component could be termed a first component, and, similarly, a first component could be termed a second component, without departing from the scope of the present invention. A term "and/or" includes any and all combinations of a plurality of associated listed items or any of the plurality of associated listed items.

It will be understood that when a component is referred to as being "coupled" or "connected" to another component, it may be not only directly coupled or connected to another component but also there may be an intervening component therebetween. On the other hand, it will be understood that when a component is referred to as being "directly coupled" or "directly connected" to another component, there is no intervening component therebetween.

The terminology used herein is for the purpose of describing particular embodiments only but is not intended to limit the invention. Singular forms are intended to include the plural forms as well, unless the context clearly indicates otherwise. In this disclosure, it will be understood that terms "comprises," "having," etc. used herein specify the presence of stated features, integers, steps, operations, elements, and/or components, but do not preclude the possibility of the presence or addition of one or more other features, integers, steps, operations, elements, components, and/or combinations thereof.

Unless otherwise defined, all terms used herein, including technical and scientific terms, have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, the exemplary embodiments will be described in detail with reference to the accompanying drawings, wherein like or corresponding components are denoted by the same reference numerals and redundant description thereof will be omitted.

Figure 1:
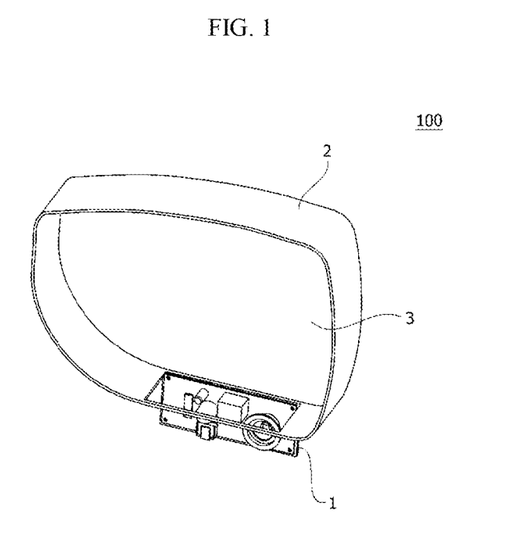
FIG. 1 is a perspective view of a side view mirror according to an exemplary embodiment.

FIG. 1 is a perspective view of a side view mirror according to an exemplary embodiment. Referring to FIG. 1, a side view mirror 100 according to the exemplary embodiment is fixed to doors of a driver's seat side and a front passenger's seat side of a vehicle, and includes an infrared object detecting module 1, a mirror housing 2, and a mirror 3.

The mirror housing 2 is fixed to a main body of the vehicle and has an accommodation space for supporting the mirror 3 therein. The mirror housing 2 may include an angle adjuster (not shown) incorporated therein for adjusting a reflection range of the side view mirror 100, and an orientation direction thereof may be adjusted and in some cases, the orientation direction thereof may be adjusted by moving the mirror 3 accommodated in the mirror housing 2.

The infrared object detecting module 1 may be fixed to the outside of the mirror housing 2, emit infrared rays in a direction in which the mirror housing 2 or the mirror 3 is oriented, and determine, using the reflected light of the emitted infrared rays, whether an object is present in the direction in which the mirror housing 2 or the mirror 3 is oriented.

The infrared object detecting module 1 may be fixed to the mirror housing 2 such that at least an optical transmitter and an optical receiver are exposed to the outside. However, the present invention is not limited thereto, and the entire infrared object detecting module 1 may be fixed to the mirror housing 2 so that the entire infrared object detecting module 1 can be exposed to the outside.

A substrate or base accommodating the infrared object detecting module 1 may be manufactured integrally with the mirror housing 2 but is not limited thereto, and may be manufactured such that a separate substrate or base is coupled to the outside of the mirror housing 2.

In the exemplary embodiment of the present invention, the infrared object detecting module 1 is described as being fixed to an outer side of a lower end of the mirror housing 2, as an example.

Figure 2:
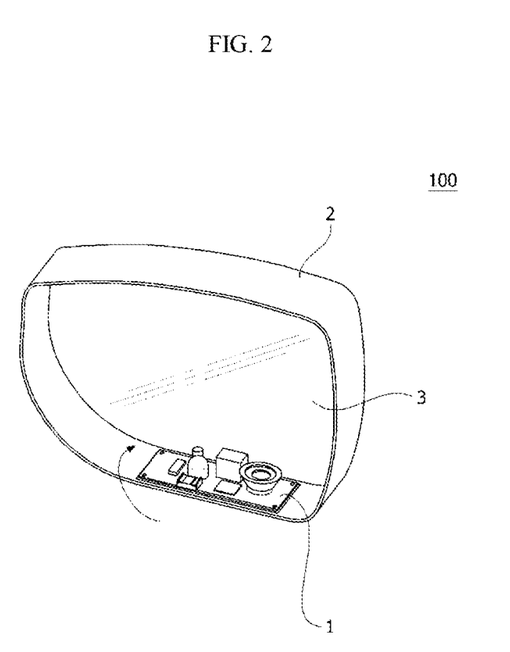
FIG. 2 is a perspective view of an infrared object detecting module seated on a side view mirror according to an exemplary embodiment.

FIG. 2 is a perspective view of the infrared object detecting module 1 seated in the side view mirror 100 according to an exemplary embodiment of the present invention. Referring to FIG. 2, the infrared object detecting module 1 may be seated inside the mirror housing 2 in a hinged door manner. The infrared object detecting module 1 is coupled to the mirror housing 2 by a hinged opening and closing method, and one side of the substrate of the infrared object detecting module 1 is fixed to one side of the lower end of the mirror housing 2 and rotates. The other side of the substrate of the infrared object detecting module 1 may be seated inside the mirror housing 2 by rotating about one side of the substrate as an axis and abutting the other side surface of the mirror housing 2.

Figure 3:
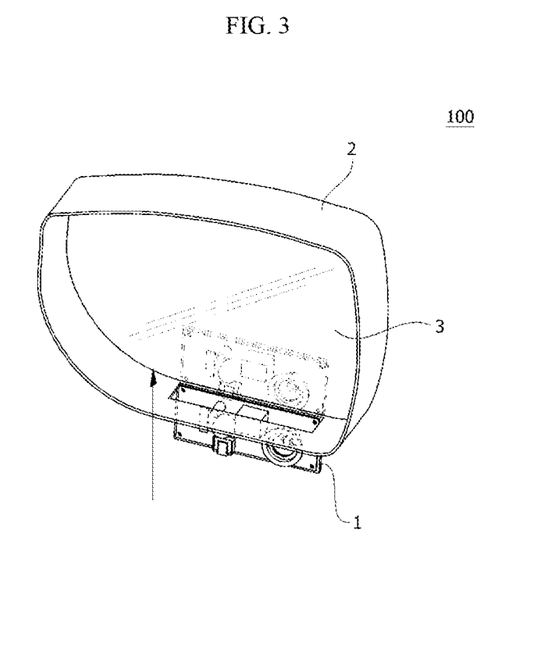
FIG. 3 is a perspective view of an infrared object detecting module seated on a side view mirror according to another exemplary embodiment.

FIG. 3 is a perspective view of an infrared object detecting module seated in a side view mirror according to another exemplary embodiment of the present invention. Referring to FIG. 3, an infrared object detecting module 1 may be seated inside a mirror housing 2 in a sliding manner. The infrared object detecting module 1 may move in a vertical direction of the side view mirror 100, and may be seated inside the mirror housing 2 by being sliding-inserted into between a mirror 3 and the mirror housing 2.

Although the exemplary embodiment shows that the object detecting module 1 is located inside the mirror housing 2 and then is exposed to the outside during operation thereof, the infrared object detecting module 1 is not limited thereto and may be designed to operate only inside the mirror housing 2.

In other words, it may be designed such that while the object detecting module 1 is disposed inside the mirror housing 2, a hole is formed in the mirror 3 or a part of the mirror 3 is formed of a transparent material so that a transmitter and a receiver can be exposed.

Figure 4:
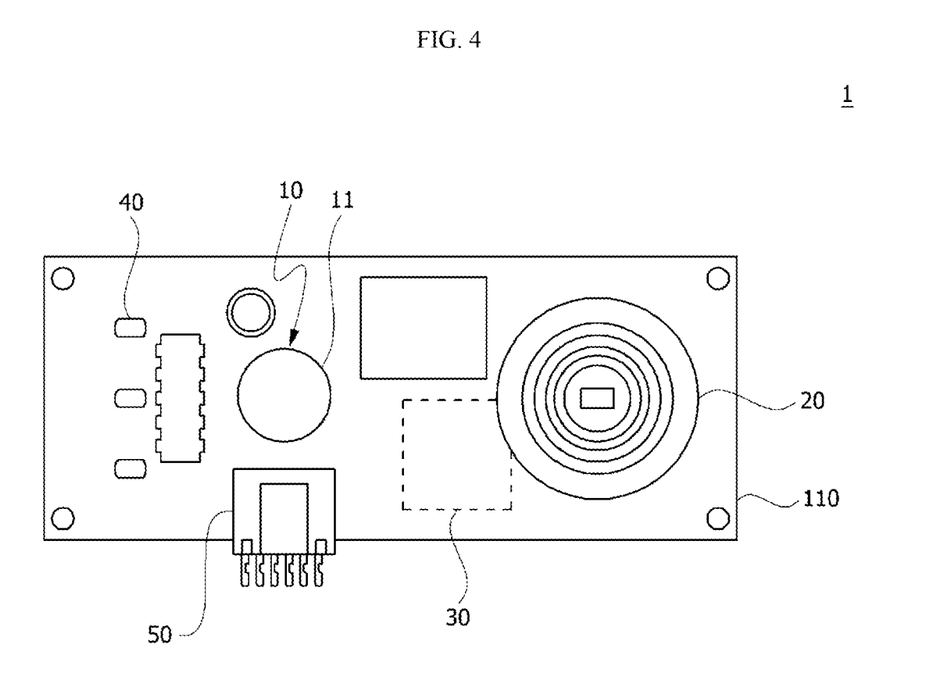
FIG. 4 is a schematic diagram of an infrared object detecting module according to an exemplary embodiment.
Figure 5:
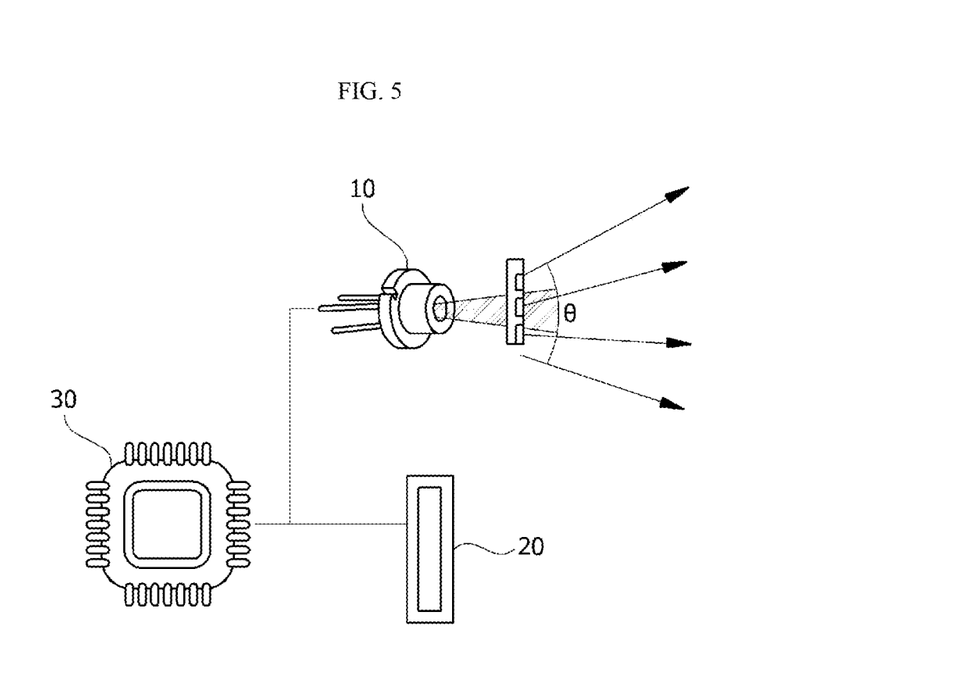
FIG. 5 is a conceptual diagram of an infrared object detecting module according to an exemplary embodiment.

FIG. 4 is a schematic diagram of the infrared object detecting module according to an exemplary embodiment of the present invention, and FIG. 5 is a conceptual diagram of the infrared object detecting module according to the exemplary embodiment of the present invention. Referring to FIGS. 4 and 5, the infrared object detecting module 1 according to the exemplary embodiment of the present invention may include an optical transmitter 10, an optical receiver 20, a controller 30, and an output unit 40.

Although the infrared object detecting module 1 according to the exemplary embodiment of the present invention is configured such that the optical transmitter 10, the optical receiver 20, the controller 30, and the output unit 40 are disposed on the same substrate 2, it is not limited thereto and the controller 30 and the output unit 40 may be disposed on a separate substrate. When the controller 30 and the output unit 40 are disposed on the separate substrate, the controller 30 and the output unit 40 may communicate through a wire 50 disposed on the substrate or a separate wireless communication module (not shown). The optical transmitter 10 and the optical receiver 20 may be disposed to be spaced a predetermined distance from each other on the substrate 2, and the distance may be determined depending on a monitoring range, a wavelength band of the light emitted from the optical transmitter 10, interference between the optical transmitter 10 and the optical receiver 20, and the like.

The optical transmitter 10 emits infrared rays of various wavelength bands to the outside according to the control of the controller 30, and the optical receiver 20 transmits the received infrared data to the controller 30.

The controller 30 may control operations of the optical transmitter 10, the optical receiver 20, and the output unit 40 and determine, using the infrared rays detected by the optical receiver 20, whether an object is present in a direction in which the optical transmitter 10 emits infrared rays. The controller 30 may control the output unit 40 to output a notification signal to the outside according to the presence or absence of an object.

The output unit 40 may output the notification signal to the outside when an object is present in the direction in which the optical transmitter 10 emits infrared rays. The output unit 40 may operate under the control of the controller 30 and include at least one of a visual output element and an auditory output element for outputting the notification signal to the outside.

Figure 6:
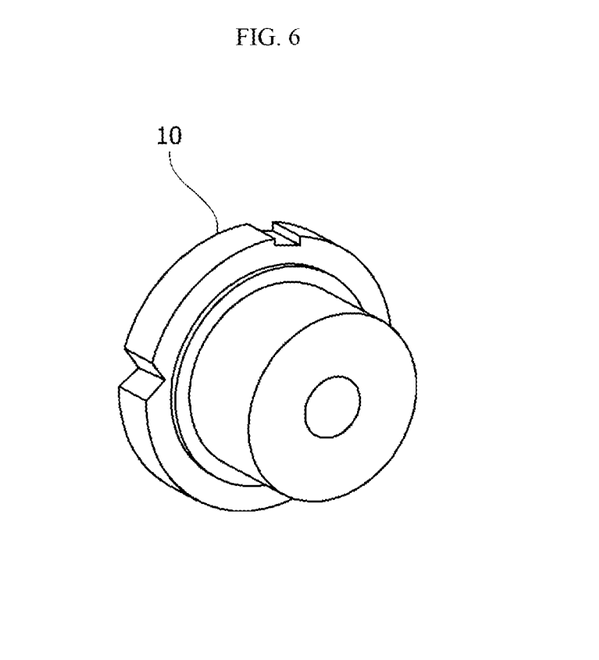
FIG. 6 is a schematic diagram of an optical transmitter according to an exemplary embodiment.

FIG. 6 is a schematic diagram of the optical transmitter according to an exemplary embodiment of the present invention. Referring to FIG. 6, the optical transmitter 10 of the infrared object detecting module according to the exemplary embodiment of the present invention may include an infrared light source that emits infrared rays in an orientation direction thereof. The infrared light source may be, for example, a light emitting diode (LED) and emit light in a direction such that a wavelength of a certain band is oriented according to the control of the controller.

In the optical transmitter 10, the bandwidth of the emitted infrared rays may be controlled according to the following equation under the control of the controller.

$$BW = \frac{C}{2D} \quad \text{[Equation]}$$

(In the above equation, BW is an optical bandwidth of the optical transmitter, C is a speed of the radio wave, and D is a sensing distance)

The optical transmitter 10 may include a plurality of infrared light sources, and the plurality of infrared light sources may emit multi-channel mixed pulse signals according to the control of the controller.

Figure 7:
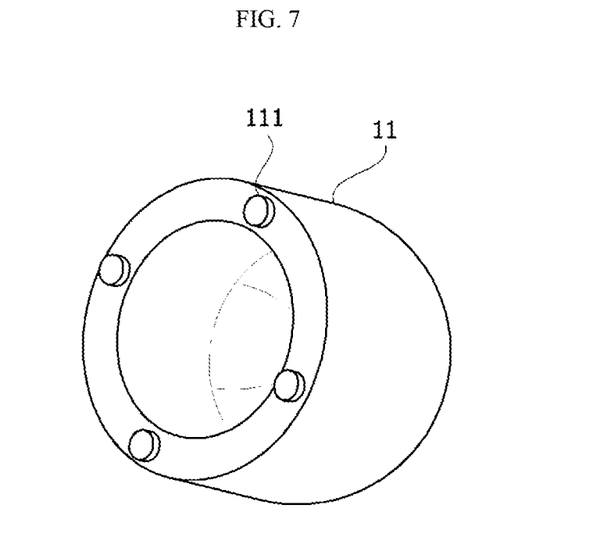
FIG. 7 is a schematic diagram of a pattern lens according to an exemplary embodiment.

FIG. 7 is a schematic diagram of a pattern lens according to an exemplary embodiment of the present invention. Referring to FIG. 7, a pattern lens 11 may be provided at a front end of the optical transmitter, and may emit infrared rays at various angles. The pattern lens 11 may be disposed on the substrate to surround the optical transmitter, and a pattern may be formed on an inner surface thereof along an infrared radiation direction.

At an end of the pattern lens 11, a protrusion 111 for fixing to the substrate may be formed along the periphery thereof.

Figure 8:
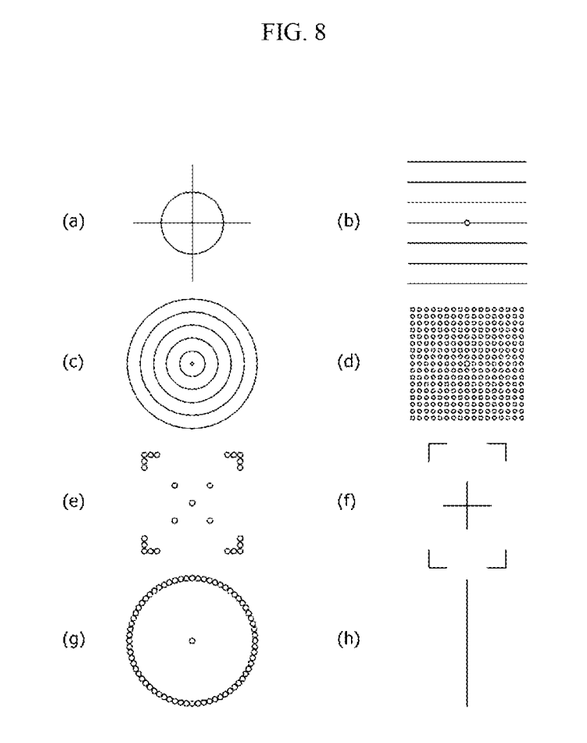
FIG. 8 is a conceptual diagram of a pattern of a pattern lens according to an exemplary embodiment.

FIG. 8 is a conceptual diagram of a pattern of the pattern lens according to an exemplary embodiment of the present invention. Referring to FIG. 8, patterns of various shapes ((a) to (h)) may be formed on the inner surface of the pattern lens depending on an infrared ray emission range. The pattern may adjust the radiation range and radiation amount of the infrared rays depending on a monitoring range, an intensive monitoring range, and the like.

Figure 9:
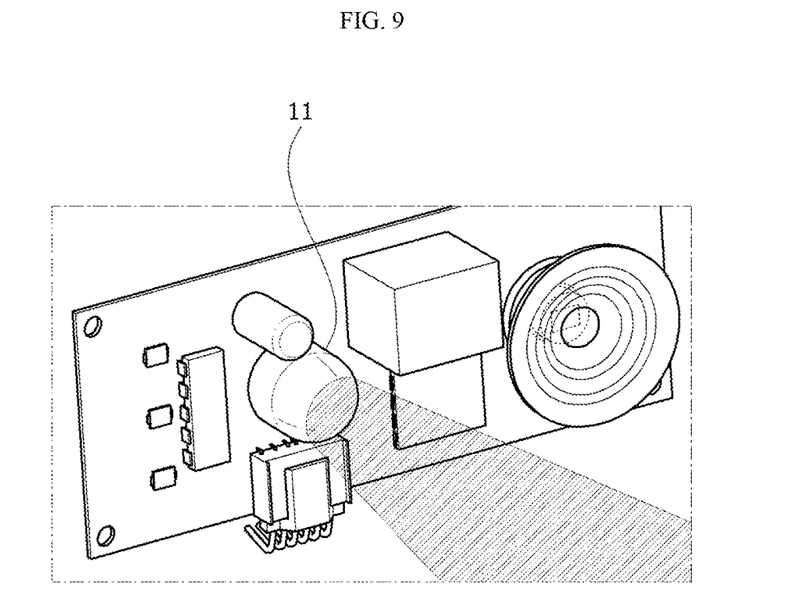
FIG. 9 is a conceptual diagram of an operation of an optical transmitter according to an exemplary embodiment.

FIG. 9 is a conceptual diagram of an operation of the optical transmitter according to an exemplary embodiment of the present invention. Referring to FIG. 9, the infrared rays emitted from the optical transmitter are radiated through the pattern lens 11 at a predetermined angle.

Figure 10:
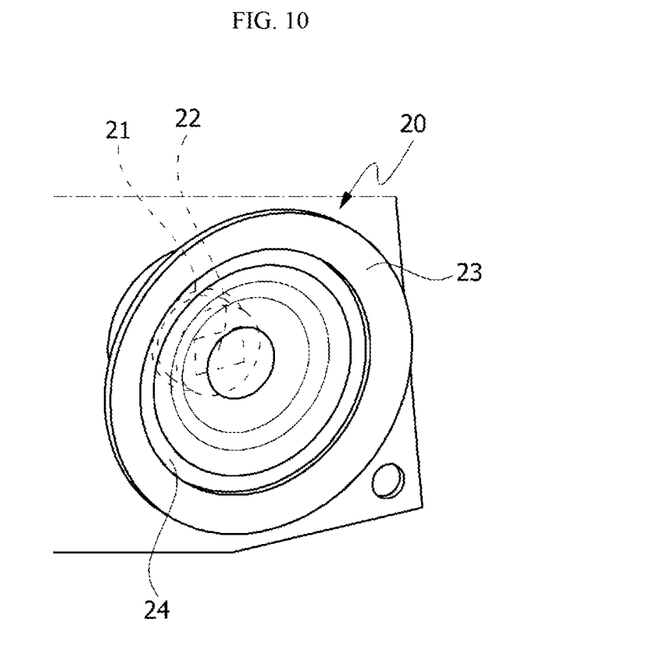
FIG. 10 is a schematic diagram of an optical receiver according to an exemplary embodiment.
Figure 11:
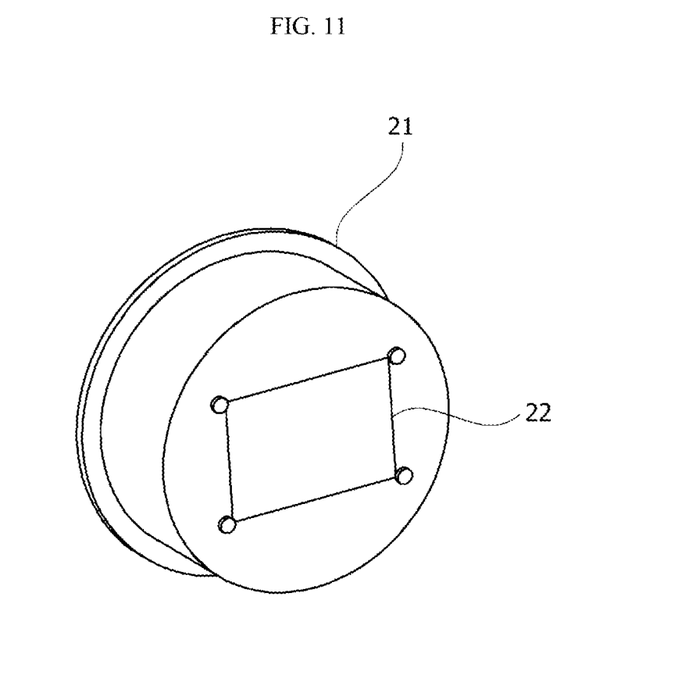
FIG. 11 is a schematic diagram of a light receiving sensor according to an exemplary embodiment.
Figure 12:
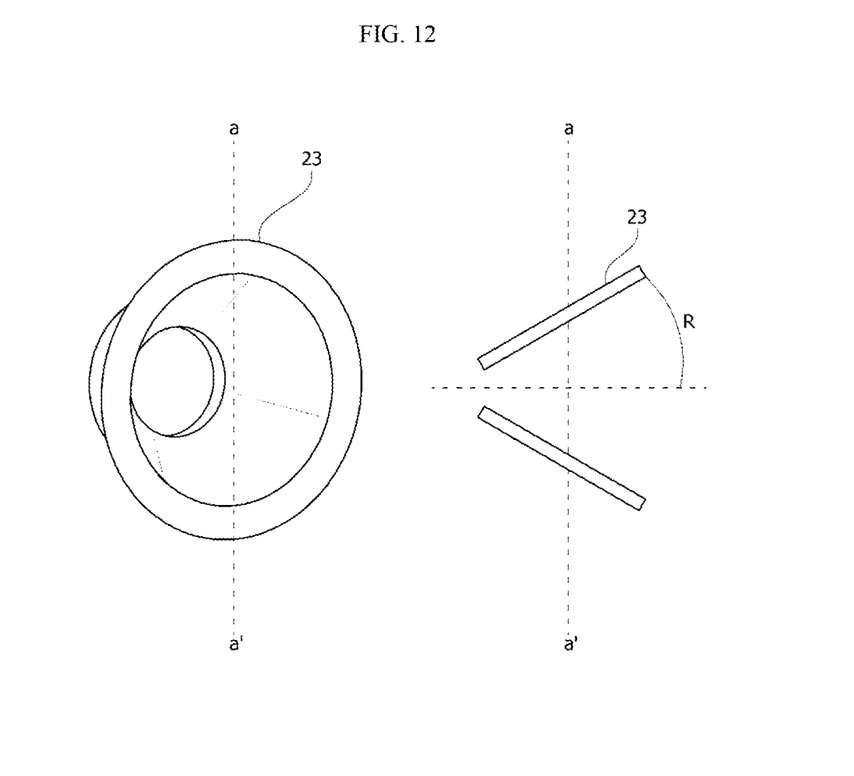
FIG. 12 is a schematic diagram of a light shielding unit according to an exemplary embodiment.
Figure 13:
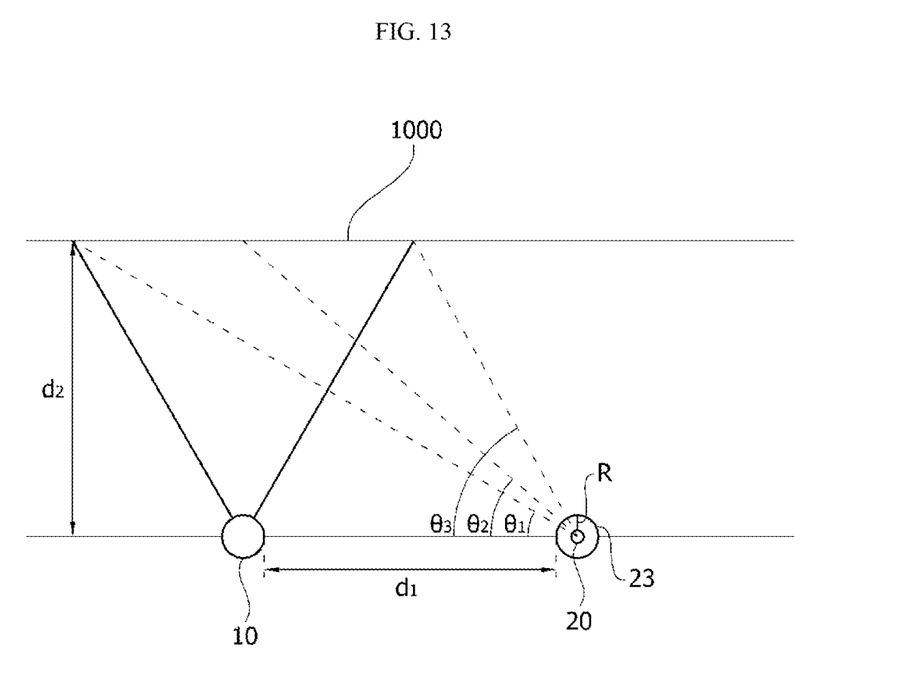
FIG. 13 is a conceptual diagram for describing an incident path of reflected light according to an exemplary embodiment.
Figure 14:
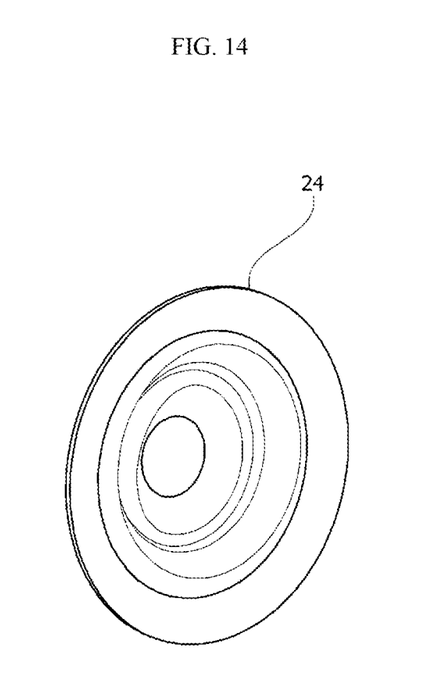
FIG. 14 is a schematic diagram of a condensing lens according to an exemplary embodiment.

FIG. 10 is a schematic diagram of the optical receiver according to an exemplary embodiment of the present invention, FIG. 11 is a schematic diagram of a light receiving sensor according to an exemplary embodiment of the present invention, FIG. 12 is a schematic diagram of a light shielding unit according to an exemplary embodiment of the present invention, FIG. 13 is a conceptual diagram for describing an incident path of the reflected light according to an exemplary embodiment of the present invention, and FIG. 14 is a schematic diagram of a condensing lens according to an exemplary embodiment of the present invention.

Referring to FIG. 10, the optical receiver 20 according to the exemplary embodiment of the present invention may include a light receiving sensor 21, a light shielding unit 23, a condensing lens 24, and a filter 22.

Referring to FIG. 11, the light receiving sensor 21 according to the exemplary embodiment of the present invention may include a photodiode or a photodetector, detect incident infrared rays, and output data regarding the sensed incident infrared rays to the controller. At this time, the filter 22 for filtering light other than the light of the wavelength band emitted by the optical transmitter is disposed at the front end of the light receiving sensor 21, and the light receiving sensor 21 detects infrared rays of a particular wavelength band incident through the filter 22 and transmits the detection to the controller.

Referring to FIG. 12, the light shielding unit 23 according to the exemplary embodiment of the present invention is disposed to surround the light receiving sensor 21 to block the external light and includes an opening formed in a direction in which the reflected light of the infrared rays emitted by the optical transmitter is incident. The light shielding unit 23 may be formed to extend in the traveling direction of the reflected light, and may be made of an optically non-transparent epoxy, a plastic, a polymer, a metal, or the like.

A diameter of the light shielding unit 23 may be formed to become smaller in the incidence direction of the reflected light. The light shielding unit 23 is designed to block natural light other than the reflected light, infrared rays emitted from the optical transmitter, and other external light and noise, but not the incident light reflected from the object. In this case, the length and diameter of the light shielding unit 23 are determined according to the incident angle of the reflected light.

Referring to FIG. 13, the infrared rays emitted from the optical transmitter 10 are reflected by the object 100 and then become incident to the optical receiver 20. When the incident angles of the reflected light are denoted by $\theta_1$, $\theta_2$, and $\theta_3$ according to the position of the object, the outermost radius R of the light shielding unit 23 is determined by the minimum incident angle $\theta_1$. Since the diameter of the light shielding unit 23 becomes smaller in the incidence direction of the reflected light, the outermost diameter R of the light shielding unit denotes the maximum diameter of the light shielding unit. Also, the incident angle of the reflected light may be determined according to a distance between the optical transmitter 10 and the optical receiver 20 and a distance between the optical transmitter 10 and the object 100. Thus, the maximum diameter of the light shielding unit 23 is determined according to the minimum incident angle of the reflected light, and the minimum incident angle of the reflected light may be determined according to the distance between the optical transmitter 10 and the optical receiver 20 and the distance between the optical transmitter 10 and the object 100.

Referring to FIG. 14, the condensing lens 24 may be disposed at the distal end of the light shielding unit. The condensing lens 24 is disposed to cover the outermost portion of the light shielding unit, and may collect the reflected light and guide the collected light to the light receiving sensor.

Figure 15:
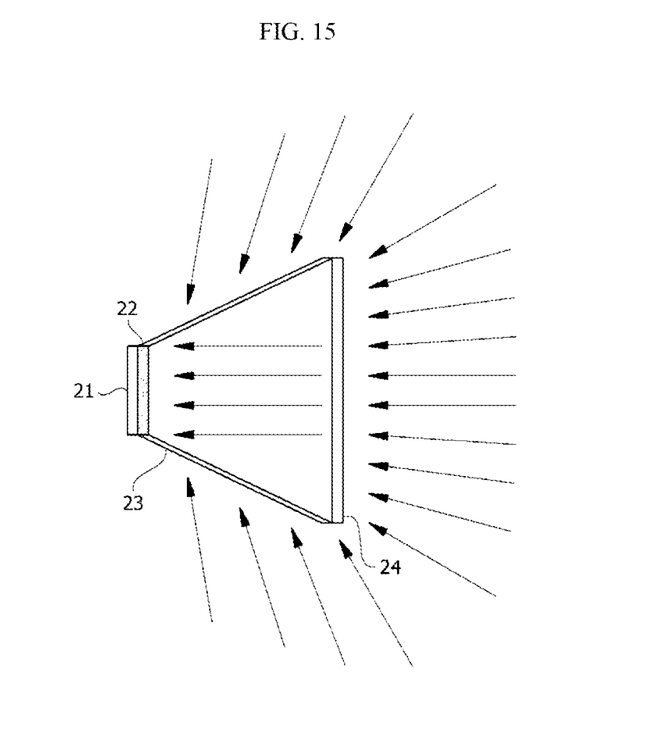
FIG. 15 is a conceptual diagram of an operation of an optical receiver according to an exemplary embodiment.

FIG. 15 is a conceptual diagram of an operation of the optical receiver according to an exemplary embodiment of the present invention. Referring to FIG. 15, the natural light incident to the light receiving sensor 21, the infrared rays emitted from the light transmitter, and other external light and noise are blocked by the light shielding unit 23. The reflected light is guided into the light shielding unit 23 through the condensing lens 24 and is transmitted to the light receiving sensor 21 through the filter 22.

Figure 16:
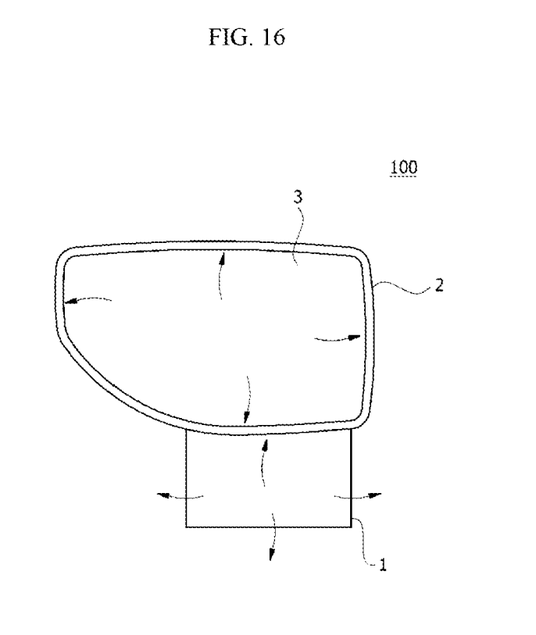
FIG. 16 is a diagram for describing an operation of a side view mirror according to an exemplary embodiment.

FIG. 16 is a diagram for describing an operation of the side view mirror according to an exemplary embodiment of the present invention. Referring to FIG. 16, the side view mirror 100 according to the exemplary embodiment of the present invention may include an angle adjusting component for adjusting the orientation angle of the mirror 3, and adjust the orientation angle of the mirror 3 through direct adjustment or operation inside the vehicle. In this case, the mirror 3 is adjusted independently of a direction in which the mirror housing 2 is oriented. When the orientation angle of the mirror 3 is adjusted, the infrared object detecting module 1 adjusts, corresponding to the mirror 3, the orientation angle. The infrared object detecting module 1 is for detecting whether an object is present in a blind spot that cannot be confirmed through the side view mirror 100, and the range of the blind spot is also changed when the orientation range of the mirror 3 is changed. Accordingly, when the orientation angle of the mirror 3 is changed, the infrared object detecting module 1 may cover the blind spot range by adjusting the orientation angle thereof in response to the orientation angle change of the mirror 3. The infrared object detecting module 1 may adjust the orientation angle thereof, for example, to be parallel to the mirror 3.

Figure 17:
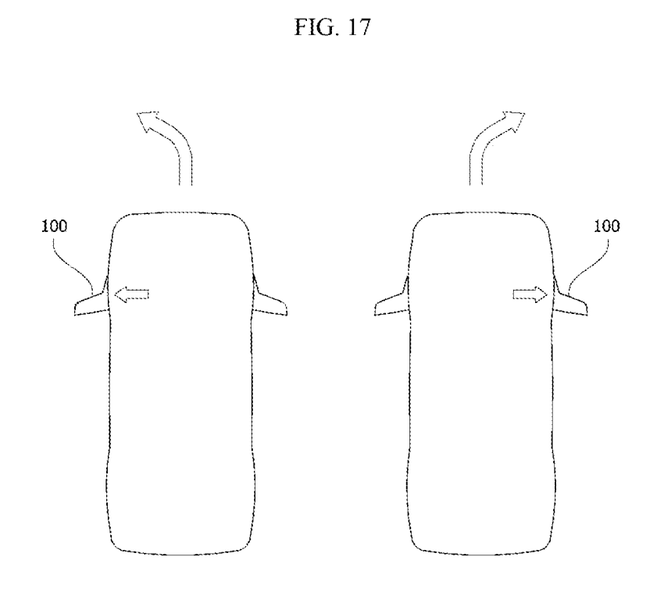
FIG. 17 is a diagram for describing an operation of a side view mirror according to another exemplary embodiment.

FIG. 17 is a diagram for describing an operation of a side view mirror according to another exemplary embodiment of the present invention. Referring to FIG. 17, an infrared object detecting module may operate in coordination with at least one of a turn signal and a steering angle signal. The infrared object detecting module mounted on left and right sides of a vehicle may be controlled so that the side view mirror on the side of the direction in which the turn signal is turned on or the side view mirror on the side of the direction the same as the steering angle signal's direction can operate. When the turn signal and the steering angle signal indicate different directions, the infrared object detecting module on the side of the direction indicated by the steering angle signal may be controlled to operate.

Figure 18:
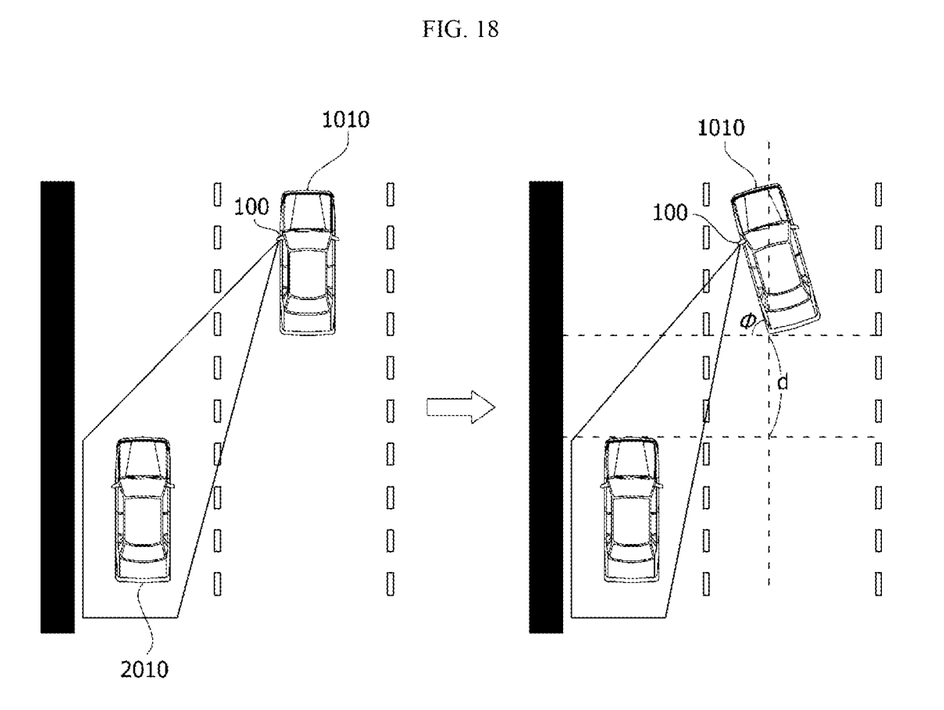
FIG. 18 is a diagram for describing an operation of a side view mirror according to yet another exemplary embodiment.

FIG. 18 is a diagram for describing an operation of a side view mirror according to yet another exemplary embodiment of the present invention. Referring to FIG. 18, an infrared object detecting module may calculate a distance from an object located in an orientation direction thereof, using the intensity of the reflected light, and determine the risk of collision by comparing a steering angle and a distance from an object 2010 in the orientation direction thereof.

The infrared object detecting module may determine that the object 2010 positioned in the orientation direction thereof is located closer to the infrared object detecting module as the intensity of the reflected light received by an optical receiver increases, and the object 2010 positioned in the orientation direction thereof becomes relatively far away as the intensity of the reflected light decreases. The infrared object detecting module may calculate the distance from the object according to the intensity of the reflected light, in consideration of the driving hour, the weather, the surrounding environment thereof, and the like.

When a vehicle 1010 changes a traveling direction thereof, the infrared object detecting module may determine the collision risk of the vehicle by comparing the steering angle and the distance from the object 2010 positioned in the direction to be taken. The infrared object detecting module may determine that there is a risk of collision with the object 2010, for example, when the distance from the rear object 2010 is d and the steering angle in the corresponding direction exceeds a threshold value ø, and then may output a warning signal to the outside.

A term "unit" used herein includes a software, a field-programmable gate array (FPGA), or a hardware component such as ASIC, and the "unit" performs certain functions. However, the "unit" is not limited to the software or hardware. The "unit" may be configured to reside on an addressable storage medium or may be configured to play one or more processors. Therefore, the "unit" may include, for example, components (such as software components, object-oriented software components, class components, and task components), processes, functions, attributes, procedures, subroutines, segments of program code, drivers, firmware, microcodes, circuitry, data, databases, data structures, tables, arrays, and variables. Functions provided in components and "units" may be combined with a smaller number of components and "units," or may be further divided into additional components and "units." Furthermore, the components and "units" may be implemented to play back one or more CPUs in a device or a secure multimedia card.

While in the foregoing disclosure, the present invention has been described with reference to the exemplary embodiments thereof, it will be understood by those of ordinary skill in the art that various modifications and variations are possible without departing from the spirit and scope of the present invention as defined by the following claims.

EXPLANATION OF SYMBOLS

1: infrared object detecting module
2: mirror housing
3: mirror
10: optical transmitting module
11: filter lens
20: optical receiving module
21: light receiving sensor
22: filter
23: light shielding unit
24: condensing lens
30: controller
40: output unit

The invention claimed is:

1. An infrared object detecting module comprising:
an optical transmitter configured to emit infrared rays in an orientation direction thereof;
an optical receiver including a light receiving sensor configured to detect incident infrared rays and a light shielding unit that is disposed to surround the light receiving sensor to block external light and includes an opening formed in a direction in which reflected light of the infrared rays emitted by the optical transmitter is incident; and
a controller configured to determine, using the infrared rays detected by the optical receiver, whether an object is present in a direction in which the optical transmitter emits the infrared rays,
wherein a filter configured to filter light other than light of a wavelength band emitted by the optical transmitter is disposed at a front end of the light receiving sensor.

2. The infrared object detecting module of claim 1, wherein the light shielding unit is formed to extend in a traveling direction of the reflected light.

3. The infrared object detecting module of claim 2, wherein a diameter of the light shielding unit becomes smaller in an incidence direction of the reflected light.

4. The infrared object detecting module of claim 3, wherein a length and the diameter of the light shielding unit are determined according to an incidence angle of the reflected light.

5. The infrared object detecting module of claim 1, wherein a condensing lens is disposed at a distal end of the light shielding unit.

6. The infrared object detecting module of claim 1, wherein a pattern lens configured to radiate the emitted infrared rays in various angles is disposed at a front end of the optical transmitter.

7. The infrared object detecting module of claim 1, wherein the controller controls a bandwidth of the infrared rays emitted by the optical transmitting module according to the following equation:

$$BW = \frac{C}{2D},$$

wherein BW is an optical bandwidth of the optical transmitting module, C is a speed of a radio wave, and D is a sensing distance.

8. The infrared object detecting module of claim 1, comprising:
an output unit configured to output an indication signal to the outside when an object is present in the direction in which the optical transmitter emits infrared rays.

9. A side view mirror comprising:
a mirror;
a mirror housing configured to support the mirror; and
an infrared object detecting module that is disposed in the mirror housing, emits infrared rays in a direction in which the mirror housing or the mirror is oriented, and determines whether an object is present in the direction in which the mirror housing or the mirror is oriented using reflected light of the emitted infrared rays,
wherein the infrared object detecting module includes:
an optical transmitter configured to emit infrared rays in an orientation direction thereof;
an optical receiver including a light receiving sensor configured to detect incident infrared rays and a light shielding unit that is disposed to surround the light receiving sensor to block external light and includes an opening formed in a direction in which reflected light of the infrared rays emitted by the optical transmitter is incident; and
a controller configured to determine, using the infrared rays detected by the optical receiver, whether an object is present in a direction in which the optical transmitter emits the infrared rays, and
wherein a filter configured to filter light other than light of a wavelength band emitted by the optical transmitter is disposed at a front end of the light receiving sensor.

10. The side view mirror of claim 9, wherein the infrared object detecting module is seated inside the mirror housing in a sliding manner or hinged door manner.

11. The side view mirror of claim 9, wherein the infrared object detecting module is fixed to an outer side of a lower end of the mirror housing.

12. The side view mirror of claim 9, wherein the infrared object detecting module adjusts an orientation angle thereof corresponding to the mirror.

13. The side view mirror of claim 9, wherein the infrared object detecting module operates in coordination with at least one of a turn signal and a steering angle signal.

14. The side view mirror of claim 9, wherein the infrared object detecting module calculates a distance from the object located in the orientation direction thereof using intensity of the reflected light.

15. The side view mirror of claim 14, wherein the infrared object detecting module determines a risk of collision by comparing the distance from the object located in the orientation direction thereof and the steering angle.

16. The side view mirror of claim 13, wherein when the turn signal is turned on at the mirror housing side, the infrared object detecting module operates in coordination with the turn signal.

17. The side view mirror of claim 13, wherein when the turn signal and the steering angle signal indicate different directions, the infrared object detecting module operates in coordination with the steering angle signal.

18. The side view mirror of claim 15, wherein the infrared object detecting module outputs a warning signal to the outside when at least one of the distance from the object located in the orientation direction thereof and the steering angle exceeds a predetermined threshold value.

19. The side view mirror of claim 9, wherein the infrared object detecting module is fixed inside the mirror housing, and the transmitter and the receiver are exposed to the outside through a hole formed in the mirror.

20. An infrared object detecting module comprising:
an optical transmitter configured to emit infrared rays in an orientation direction thereof;
an optical receiver including a light receiving sensor configured to detect incident infrared rays and a light shielding unit that is disposed to surround the light receiving sensor to block external light and includes an opening formed in a direction in which reflected light of the infrared rays emitted by the optical transmitter is incident; and
a controller configured to determine, using the infrared rays detected by the optical receiver, whether an object is present in a direction in which the optical transmitter emits the infrared rays,
wherein the light shielding unit is formed to extend in a traveling direction of the reflected light, and
wherein a diameter of the light shielding unit becomes smaller in an incidence direction of the reflected light.

* * * * *